UNITED STATES PATENT OFFICE.

FRITZ HOLGER BROWN, OF CHICAGO, ILLINOIS.

MILK SUBSTITUTE.

1,259,483.  Specification of Letters Patent.  Patented Mar. 19, 1918.

No Drawing.  Application filed July 14, 1917. Serial No. 180,560.

*To all whom it may concern:*

Be it known that I, FRITZ HOLGER BROWN, a citizen of the United States, residing at 2629 West Monroe street, in the city of Chicago, in the county of Cook and State of Illinois, have invented certain new and useful Improvements in Milk Substitutes, of which the following is a specification.

This invention relates to certain new and useful improvements in a shortening and substitute for milk in the making of breadstuffs, confectionery, etc., and in the process of producing the same.

It has for its objects among others the production of a material which when added to water in the proper proportions, constitutes a perfect substitute for skimmed milk in the making of bread-stuffs.

It has for a further object the production of a material which acts as a source of economy to the user by accomplishing a material reduction in the amounts of more expensive materials, such as sugar, yeast and shortening, used.

The material, broadly stated, embodies a mixture of starch, a dextrin, maltose, dextrose, (or other sugar), an edible oil or fat, salt, and water, in a permanent and stable form, said admixture being accomplished by special mechanical manipulation and the application of heat.

Other objects and advantages of the invention will hereinafter appear and the novel features thereof will be particularly pointed out in the appended claims.

The product is a whitish, translucent material of syrupy consistency. It is miscible with water in all proportions. It contains no artificial preservatives. As prepared commercially, it is made preferably from wheat flour, commercial glucose, cottonseed oil, ordinary salt, and water. It constitutes a superior method of utilizing commercial glucose in the making of all kinds of breadstuffs, overcoming, as it does, the tendency of glucose, as ordinarily used, to make bread-stuffs heavy or soggy.

The invention is based, further, on the fundamental principle of combining with the sugar used, a shortening fat or oil by virtue of which admixture or combination the glucose does not, as above stated, cause heaviness or sogginess of the product in which it is employed, and the shortening effect of the fat or oil is enhanced because it is in a state of fine emulsification. The starch serves as an emulsifying agent.

When used in making confectionery, it gives a desirable softness to the product without excessive stickiness, this probably being due to the intimate admixture of emulsified fat.

The proportionate amounts of the constituents may be varied over a rather wide range, but the formula given below represents the most practical mixture for commercial purposes as the emulsification is perfectly maintained, there is no decomposition, and the product is thin enough to pour and measure. As placed on the market the formula is as follows:—

|  | Parts per 100 by weight. |
|---|---|
| Commercial glucose | 58.3 |
| Cottonseed oil | 7.5 |
| Wheat flour | 9.2 |
| Salt (NaCl) | 8.3 |
| Water | 16.7 |
|  | 100.0 |

The method of treating the above materials is as follows:—

The oil and flour are rubbed together. Six (6) parts of the salt are dissolved in the water which is heated to boiling. Two and three-tenths ($2\frac{3}{10}$) parts of the salt are dissolved in the glucose which is heated to 120° F.

The boiling-hot water (containing part of the salt in solution) is added to the oil-flour mixture and vigorously stirred until a perfectly smooth mixture is obtained. The warm glucose (containing the balance of the salt in solution) is then added gradually, with constant stirring, until a perfectly smooth mixture is obtained.

The finished product is then passed through a fine sieve to remove any lumps or extraneous substances.

When a solid or semi-solid fat or oil preparation is used, it is necessary to warm the same to melting point before admixing with flour.

The material is sold in the concentrated form as prepared above.

When used as a milk substitute, three (3) ounces are added to sufficient water to make one (1) quart, and thoroughly mixed by stirring or shaking. This mixture with water has the following composition as compared with skimmed milk. The table also shows the composition of the undiluted product.

|  | Milk substitute alone. | Milk substitute and water 3 to 29. | Skimmed milk. |
|---|---|---|---|
| Fat | 7.6% | 0.7% | 0.8% |
| Proteins | 1.0% | 0.1% | 3.1% |
| Carbohydrates | 54.9% | 5.0% | 4.5% |
| Salts | 8.4% | 0.8% | 0.7% |
| Water | 28.1% | 93.4% | 90.9% |
|  | 100.0% | 100.0% | 100.0% |

When used in making confectionery, it may be used in the concentrated form or diluted with water.

What is claimed as new is:—

1. A shortening and milk substitute for use in making breadstuffs, confectionery, etc., the same being composed of starch, a sweetening ingredient, an edible fatty substance, salt, and water.

2. A shortening and milk substitute for use in making breadstuffs, confectionery, etc., the same being composed of wheat flour, commercial glucose, an edible fatty substance, salt and water.

3. A shortening and milk substitute for use in making breadstuffs, confectionery, etc., consisting of commercial glucose, cottonseed oil, wheat flour, salt and water.

4. A shortening and milk substitute for use in making breadstuffs, confectionery, etc., consisting of commercial glucose, cottonseed oil, wheat flour, salt and water, the oil, flour and salt being of substantially equal proportions, and the glucose forming a major portion.

5. The method of producing a shortening and milk substitute which consists in mixing together oil and flour, dissolving salt in boiling water, dissolving salt in glucose and adding the same to the oil and flour mixture, stirring the same until a smooth mixture is obtained, then adding gradually during constant stirring the glucose and salt, and sifting the same to remove lumps or extraneous substances.

In testimony whereof I affix my signature in the presence of two witnesses.

FRITZ HOLGER BROWN.

Witnesses:
EMIL ANDERSEN,
JESSEE OGIER.